United States Patent

[11] 3,582,872

[72] Inventor Roger H. Prager
San Diego, Calif.
[21] Appl. No. 379,054
[22] Filed June 29, 1964
[45] Patented June 1, 1971
[73] Assignee The United States of America as represented by the Secretary of the Navy

[54] THRESHOLD CONTROL FOR SONAR
4 Claims, 3 Drawing Figs.
[52] U.S. Cl. .................................................. 340/6-R,
343/7-A
[51] Int. Cl. ....................................................... G01s 3/00
[50] Field of Search .......................................... 340/3, 6;
343/5, 7, 17.1, 115, 118, 5 DP

[56] References Cited
UNITED STATES PATENTS
3,214,754 10/1965 Hilderbrandt ................ 343/7(A)

Primary Examiner—Richard A. Farley
Attorneys—R. S. Sciascia and G. J. Rubens

CLAIM: 1. A sonar system comprising: an omnidirectional transducer for converting sonic waves to electrical signals, and means for generating separate beam signals received along separate radial directions; a voltage comparator with two inputs and one output; a threshold voltage source coupled to one input of said comparator, first swtich means for successively applying said separate beam signals to the other input of said comparator to pass to said output only those beam signals which exceed in amplitude the threshold voltage, a gate; computer means coupled to the output of said comparator and responsive to all beam signals passed by said comparator, said computer means being responsive to said beam signals throughout a predetermined number of beam signal intervals of time for modifying the background threshold voltage; a plurality of sonar signal overload controllers corresponding in number to the number of beam signals to be sampled; second switch means for successively connecting said overload controllers to the output of said comparator; interlock means between said first and second switch means, and means for successively adding each integrated signal voltage to said threshold voltage as each signal beam is sampled.

INVENTOR.
ROGER H. PRAGER 3,582,872

THRESHOLD CONTROL FOR SONAR

The invention described herein may be manufactured and used by or for the Government of the United States of America for governmental purposes without the payment of any royalties thereon or therefor.

This invention relates to sonar receivers and it is particularly directed to threshold control circuits.

Sonar system currently developed and in use comprise an array of underwater transducers arranged in a vertical axis right circular cylinder. Each transducer element is connected through a separate circuit to the receiving equipment aboard ship. Because of the weight and the size of the transducer array it is impractical to mechanically rotate the array. It has been found practical to "electrically" rotate the transducer array so that the sonar can "see" in all directions. It has been found practical to so combine phase-shifted or time-delayed signals from several vertical groups of elements to increase the gain of the array in any one direction. In a typical array, there are provided 48 "staves" or vertical groups of transducer elements, the voltages of these staves being so combined as to provide 48 simultaneous beams 7½° wide at the half-power points. The array is effectively omnidirectional. For displaying target signals received from all points of the compass, it is a simple matter to successively sample the beam voltages. Each beam voltage is separately amplified, sampled and displayed. In the process, many of the background noise voltages must be excluded from the signals displayed, else the display screen would show many signals of no importance and the desired target signal would be lost. It has been found necessary, then, to compare each incoming signal, or sonar event, with a locally generated threshold voltage which must be exceeded for the event to pass into the display circuits of the equipment. The threshold is generally established at a high enough level to exclude the more constant noise signals. If the background noises in the various beams are all stationary (that is, if their statistical characteristics do not vary with time), and if the background noises in the various beams all have the same statistics, then a single constant threshold is sufficient and no threshold control is required. At the other extreme is the case actually encountered in sonar operators; the background noises in the various beams are nonstationary, statistically different from beam to beam, and they contain unpredictable high-level localized noise signals. Under these conditions, loss of desired target signals can only be avoided through use of a separate, automatically-controlled threshold for each beam. The rise and decay time constants of the control circuits for these thresholds must be matched to the rate at which the background noise statistics are observed to vary. For example, if the rise time constant is too short, the onset of a desired target signal with some extension in time will cause the threshold to increase too rapidly resulting in the loss of the latter portion of the signal. Similarly, if the decay time constant is too long, a high-level noise signal in a given beam will cause the sonar to be "blind" in that beam for a considerable period of time.

The paramount object of this invention is to provide an improved threshold control system for sonar receivers.

The object of this invention is obtained in a sonar system in which events which exceed threshold are fed into the sonar data-processing and display equipment. The data processor is a digital computer which computes the necessary base threshold for application to the signal-to-threshold comparator. The loop including the computer has a "time constant" which is relatively long and changes in the base threshold are made in discrete steps. According to an important feature of this invention, a set of control loops with relatively short time constants is super-imposed upon the mentioned long time constant loop. Each short time constant loop comprises a separate overload controller, and there is one controller for each beam to be sampled. Each overload controller is switched into the loop by switch means interlocked with the beam signal selecting switch. In operation, if a given beam produces a high-level noise signal for a sufficient period of time, the overload controller for that beam will generate a threshold increment which is added to the base threshold for use only with that beam. Overload or signal saturation on one beam will, therefore, not effect the sensitivity of the system to desired target signals received in any of the other beams.

Other objects and features of this invention will become apparent to those skilled in the art by referring to the specific embodiment described in the following specification and shown in the accompanying drawing in which.

Figure 1:
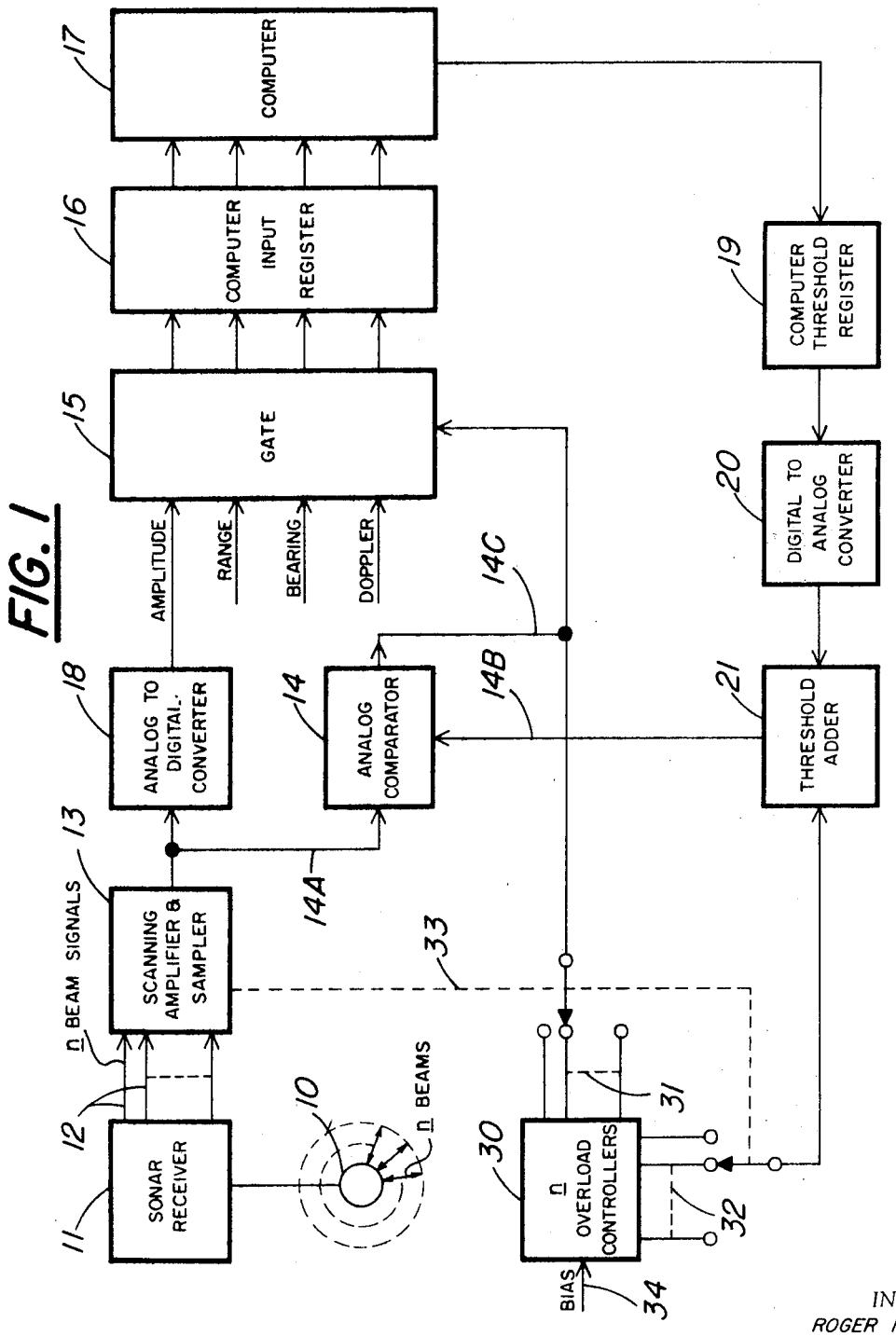
FIG. 1 is a block diagram of the sonar threshold system of this invention.

The transducer array 10 of FIG. 1 contemplates a cylindrical arrangement of transducer elements each connected to the sonar receiver 11 which, in turn, is capable of so combining the signals from all of the elements as to produce $n$ beam signals which are usually further processed before thresholding. The transducer may be of the type described in greater detail in the copending application of Charles E. Green, Navy Case No. 30,166, Ser. No. 84,964, filed 25 Jan. 1961. The specific array considered here comprise 48 transducer staves looking in diverging directions, 7½° apart. $n$ beam signals appear, respectively, on $n$ output leads from the sonar receiver. At 13 is shown the scanning amplifier and sampler switch mechanism for successively sampling the beam signals on each of the $n$ output lines. The single output lead of the scanning amplifier 13 is applied to one of the two input terminals 14A and 14B of the analog comparator 14. The other input of the comparator supplies the threshold voltage required for the particular beam being sampled. Those sonar signals which exceed the threshold cause an enabling pulse to appear on output lead 14C which is applied to the gate structure 15. The enabled gate then passes the sonar signal amplitude in digital form into the computer input register 16 along with other information relevant to the sonar signal supplied from the sonar receiver. Since the computer 17 contemplated here is of the digital type, the sonar signal amplitude must be converted from analog to digital form, as in converter 18. It has been found that a binary word of 30 bits is sufficient to carry the required information. The information contained in a number of events received during the previous receiving intervals is integrated by the computer to generate a threshold value which is employed as the base threshold for all beams. The base threshold in digital form is stored in the computer threshold register 19. The stored threshold voltage is converted from digital to analog form in the converter 20 and is applied through threshold adder 21 to the input terminal 14B of the comparator 14. In normal operation, as the background noise level slowly rises and falls, the base threshold voltage applied at 14B rises and falls correspondingly. The time constant of such a control loop including the computer 17 is relatively long compared to the receiving interval of the system.

According to an important feature of this invention, the base threshold voltage applied to the analog comparator 14 through threshold adder 21 is supplemented by a second threshold voltage which is responsive only to and effective only during the sampling of a single beam. At 30 is shown the set of $n$ overload controllers, $n$ being the number corresponding to the number of beams formed by the sonar receiver 11. Each of the $n$ overload controllers comprises an integrating circuit for generating a voltage in response to the superthreshold signals received, respectively, on each beam. A single pole $m$-position switch 31 connects the input of each controller to the output of the analog comparator 14. A single pole $h$-position switch 32 connects the output of each controller to the threshold adder 21 to be added to the base threshold voltage supplied by the computer. Switches 31 and 32 are synchronized through control 33 from the scanning amplifier and sampler 13. A manually-controlled bias is applied at terminal 34 to establish the minimum integrator output voltage at which the controllers 30 supply supplemental threshold control. This bias is required to avoid raising of the threshold by desired target signals or other high level signals of about the same duration.

Figure 2:
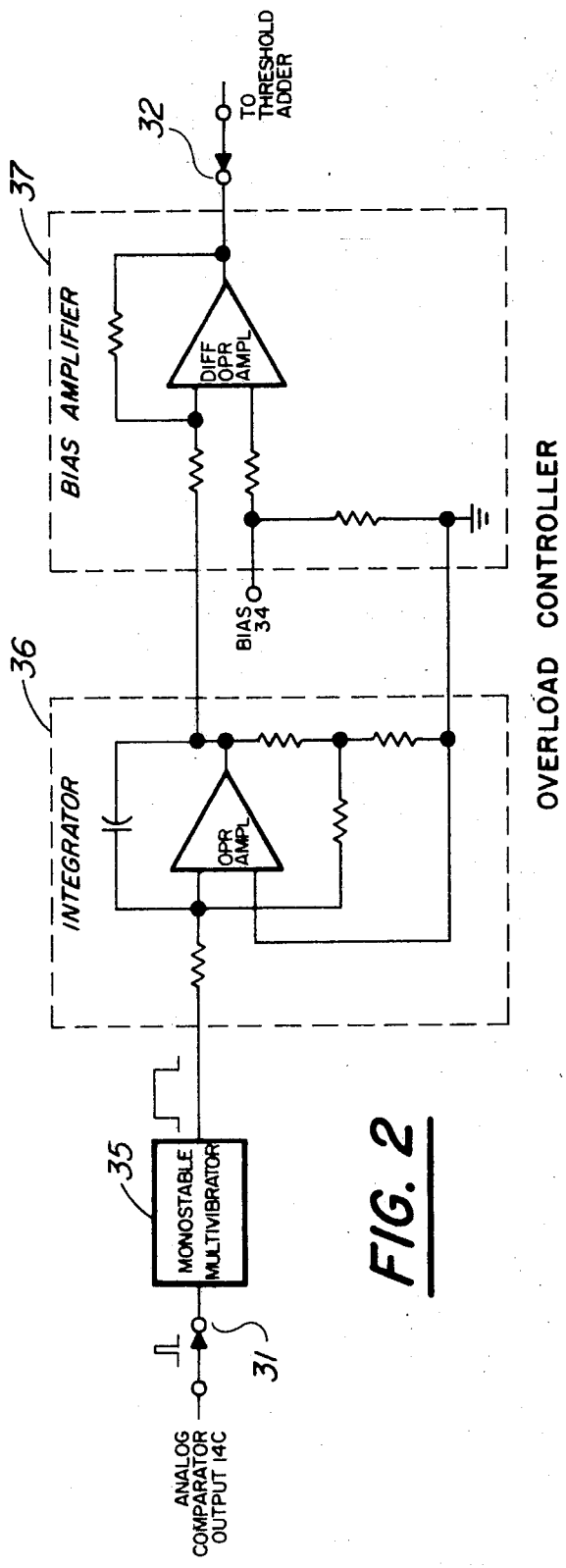
FIG. 2 shows an example of an overload controller employing analog computing techniques.

A simple example of an overload controller is shown in FIG. 2. This controller comprises a monostable multivibrator 35, an operational amplifier used as an inverting integrator 36, and an operational amplifier used as a bias-subtracting and inverting amplifier 37. The operational amplifiers 36 and 37 may be of conventional construction, each with two input terminals. However, in the application of the operational amplifier contemplated here, one input terminal of each amplifier is referred to ground. To the one input of amplifier 37, conveniently, is added the adjustable bias of terminal 34. Monostable multivibrator 35 converts the analog comparator output pulse 14C, which has relatively short duration, into a pulse of duration slightly less than the period between samples for a single beam. Integrator 36 has rise and decay time constants determined by the values of the capacitor and the various resistors in the circuit. The amplifier 37 provides the inversion, bias subtraction of bias voltage at terminal 34, and gain required before the integrator output can be used in threshold adder 21.

Figure 3:
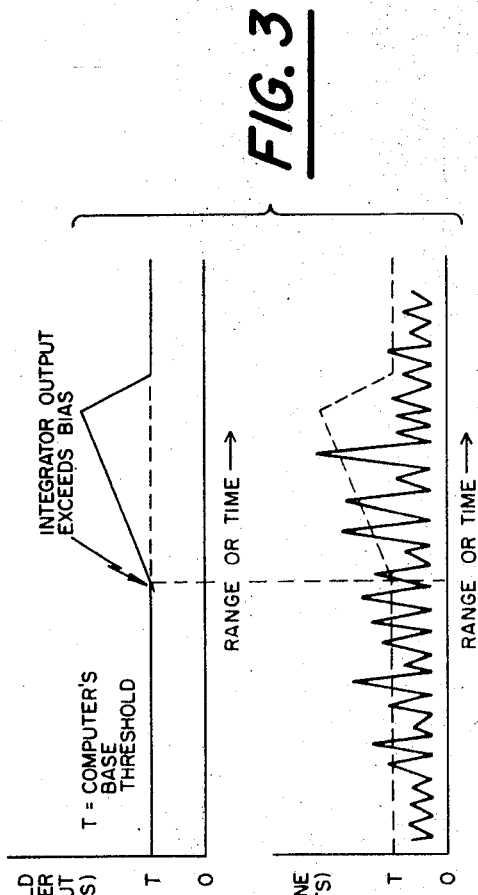
FIG. 3 is a threshold voltage waveform explanatory of the threshold system of this invention.

FIG. 3 shows an example of a sequence of high level signals in one beam and the effect of this sequence on the threshold adder output.

It appears now that an overpowering localized signal from any one direction by the transducer array is able to influence the threshold only for following signals from that same direction. That is, the sonar system is not rendered insensitive by strong localized signals.

Each of the components of the sonar system of FIG. 1 may assume many specifically different forms without departing from the scope of the invention as defined in the appended claims.

What I claim is:

1. A sonar system comprising
   an omnidirectional transducer for converting sonic waves to electrical signals, and means for generating separate beam signals received along separate radial directions;
   a voltage comparator with two inputs and one output;
   a threshold voltage source coupled to one input of said comparator, first switch means for successively applying said separate beam signals to the other input of said comparator to pass to said output only those beam signals which exceed in amplitude the threshold voltage, a gate;
   computer means coupled through said gate to the source of said beam signals, the control of said gate being coupled to the output of said comparator and responsive to all beam signals passed by said comparator, said computer means being responsive to said beam signals throughout a predetermined number of beam signal intervals of time for modifying the background threshold voltage;
   a plurality of sonar signal overload controllers corresponding in number to the number of beam signals to be sampled for separately integrating the beam signals received from each radial direction;
   second switch means for successively connecting said overload controllers to the output of said comparator;
   interlock means between said first and second switch means, and
   means for successively adding each integrated signal voltage to said threshold voltage as each signal beam is sampled.

2. A sonar receiving system comprising;
   an array of circularly arranged transducer elements with means for combining element voltages and generating beam signals arriving from different diverging directions;
   threshold comparator means coupled to said array for passing only beam signals above a threshold voltage;
   a first circuit responsive to said beam signals for integrating a plurality of said signals and generating long-time constant threshold voltage changes;
   a second circuit responsive to a single beam signal for generating a short-time constant threshold voltage change; and
   means for combining and applying the long and the short threshold voltages to said comparator means.

3. In the sonar receiving system defined in claim 2, said threshold comparator means further comprising;
   a gate with a signal circuit coupled in the output of said transducer array and a control circuit responsive to the output of said comparator.

4. A sonar system comprising a source for $n$ different sonar signals;
   a gate with a signal circuit connected to said signal source and a control circuit for selectively closing said signal circuit;
   a comparator with a signal input terminal and a threshold voltage input terminal for comparing each sonar signal of said source with a variable threshold voltage, and means for applying signals passed by said comparator to said gate control circuit;
   a first control loop with a relatively long time constant integration circuit for generating a threshold voltage coupled between the output of said gate and said threshold voltage input terminal of said comparator;
   a threshold adder connected in said first loop for altering said threshold voltage;
   a short time constant control loop comprising $n$ over load controllers coupled between the output of said comparator and an input to said threshold adder, with a single pole $h$-position switch for successively adding each of $n$ signal voltages to said threshold voltage.